United States Patent [19]
Hubbard

[11] Patent Number: 4,957,251
[45] Date of Patent: Sep. 18, 1990

[54] PIPE SUPPORTING BRACKET

[76] Inventor: George R. Hubbard, 4425 Caminito Tecera, Del Mar, Calif. 92014

[21] Appl. No.: 393,043

[22] Filed: Aug. 8, 1989

Related U.S. Application Data

[63] Continuation of Ser. No. 214,761, Jul. 5, 1988, abandoned.

[51] Int. Cl.$^5$ .............................................. F16L 3/00
[52] U.S. Cl. .................................. 248/68.1; 248/126; 248/231; 248/300
[58] Field of Search .................... 248/49, 57, 58, 62, 248/65, 68.1, 70, 74.1, 74.3, 126, 207, 218.4, 231, 300

[56] References Cited

U.S. PATENT DOCUMENTS

| | | | |
|---|---|---|---|
| 861,814 | 7/1907 | Crain | 248/300 |
| 1,260,951 | 3/1918 | Baker | 248/70 |
| 1,938,818 | 12/1933 | Erickson | 248/300 |
| 2,343,363 | 7/1958 | Mailander | 257/124 |
| 2,387,951 | 10/1945 | Slater et al. | 248/68 |
| 2,757,458 | 8/1956 | Zipser | 248/231 |
| 2,773,708 | 12/1956 | Beyerle | 285/64 |
| 3,256,030 | 6/1966 | Banse | 248/300 |
| 3,292,886 | 12/1966 | Rovinsky | 248/49 |
| 3,347,505 | 10/1967 | Menser | 248/74.1 |
| 3,718,307 | 2/1973 | Albanese | 248/57 |
| 3,923,277 | 12/1975 | Perrault | 248/49 |
| 3,944,175 | 3/1976 | Kearney | 248/59 |
| 4,550,451 | 11/1985 | Hubbard | 248/56 |

FOREIGN PATENT DOCUMENTS

| 997405 | 9/1951 | France | 248/68.1 |
|---|---|---|---|
| 1322281 | 2/1963 | France | 248/49 |

OTHER PUBLICATIONS

O-Strut Engineering catalog No. 87, 1987.
Superstrut, illustrated price list, 11/23/87.

Primary Examiner—Ramon O. Ramirez
Assistant Examiner—Robert A. Olson
Attorney, Agent, or Firm—Brown, Martin, Haller & McClain

[57] ABSTRACT

A pipe supporting bracket of generally square, channel-shaped cross-section comprises a central web portion with a pair of side flanges depending from the respective opposite side edges of the web portion. The web portion and side flanges have spaced openings along their length for receiving suitable fastener devices for securing pipes against the respective faces of the bracket. In one version, the bracket is secured to the floor and projects vertically to provide pipe locating and securing surfaces. In another version, the central web portion has a projecting portion at one end for locating against and securing to a suitable supporting member.

8 Claims, 3 Drawing Sheets

PIPE SUPPORTING BRACKET

This is a continuation of application Ser. No. 214,761, filed July 5, 1988, now abandoned.

BACKGROUND OF THE INVENTION

The present invention relates generally to the installation of plumbing systems in building construction, and particularly to a pipe supporting bracket for supporting pipes in predetermined spaced relationship.

A plumbing system in a building must supply water to all the plumbing fixtures in the building, such as sinks, bath fixtures and toilets. Thus, numerous hot and cold water pipes are typically installed in the walls of a building during construction, extending both horizontally and vertically, and must be adequately supported in fixed relation to one another to prevent movement which could lead to excessive noise and even rupture of the pipe.

Various types of supports or hangers have been proposed in the past to secure plumbing pipes at spaced intervals to various supporting structures such as building studs, waste pipes and the like, and to one another to provide a fixed spatial relationship between the pipes for alignment with fixture inlets and outlets, for example. In U.S. Pat. No. 4,550,451 of Hubbard, a plumbing pipe locator and support is described, which includes a strap securable to the building structure and having openings for receiving pipes which are secured in the openings by an adhesive, by soldering, or by means of suitable inserts.

U.S. Pat. No. 3,944,175 of Kearney describes a pipe supporting structure comprising a central body having pipe receiving recesses to which support members may be secured to fasten the structure to fixed building members such as beams, large waste pipes, or large water pipes. The support members are in the form of channel shaped lateral clamps which receive the central body at one end and which have an L-shaped contact member at the other end for locating against a construction member to prevent lateral movement when the support member is secured to the construction member via a suitable fastener.

SUMMARY OF THE INVENTION

It is an object of the present invention to provide an improved pipe supporting structure for plumbing systems.

According to the present invention, a pipe support is provided which comprises a bracket of generally square, channel shaped cross section having a central web portion with side flanges depending from the opposite side edges of the central web portion. The central web portion and side flanges have spaced openings for receiving suitable fasteners for selectively securing pipes against the faces of the central web portion and side flanges, and for securing the locating surface against a suitable supporting member. The openings in each face of the bracket preferably include a series of elongate slots for receiving connecting bands, and a series of circular openings for receiving bolts.

In one embodiment, the central web portion extends beyond the ends of the side flanges at least at one end of the bracket to provide a locating surface for locating against a suitable supporting structure, such as a building stud, large waste pipe or water pipe. Preferably, the end edges of the side flanges adjacent the projecting locating surface of the central web portion are inclined or cut at an obtuse angle to the surface to allow the locating surface to extend further over the desired supporting member until the end edges butt up against the member. In an alternative embodiment, the bracket is securable at one end to a floor so as to extend vertically from the floor to provide support and attachment surfaces.

In the preferred embodiment of the invention, the central web portion and side flanges each have at least two sets of openings, one set comprising a plurality of elongate slots for receiving securing bands which can be threaded through the slots for extending around a pipe or member to which the bracket is to be secured, and the other set comprising a plurality of generally circular openings for receiving bolts which extend through openings in a suitable C-shaped clamp for extending around a pipe to secure it against an appropriate face of the bracket. In one embodiment, a row of elongate slots extends along the center line of the central web of the bracket, with rows of bolt openings extending on each side of the row of slots. The side flanges each have one row of slots and one row of bolt openings.

The pipe supporting bracket of this invention allows different diameter pipes to be secured to the bracket either in vertical or horizontal orientations. A plurality of brackets can be used together with fasteners such as connecting bands and clamps to support an entire plumbing system quickly and easily. The system requires a minimum of different components to interconnect and support all pipes from suitable vent or waste pipes.

BRIEF DESCRIPTION OF THE DRAWINGS

The invention will be better understood from the following detailed description of some preferred embodiments, taken in conjunction with the accompanying drawings, in which like reference numerals refer to like parts, and in which.

DESCRIPTION OF THE PREFERRED EMBODIMENT

Figure 1:
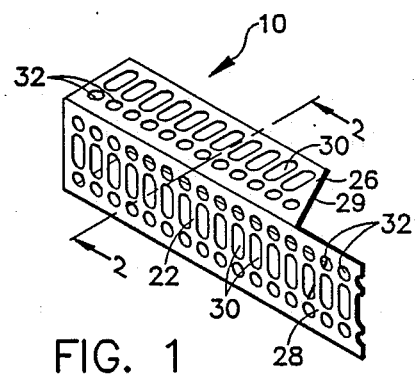
FIG. 1 is a perspective view of a pipe supporting bracket according to a first embodiment of the present invention.
Figure 2:
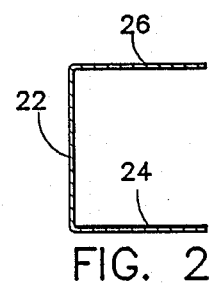
FIG. 2 is a sectional view of the lines 2—2 of FIG. 1.
Figure 3:
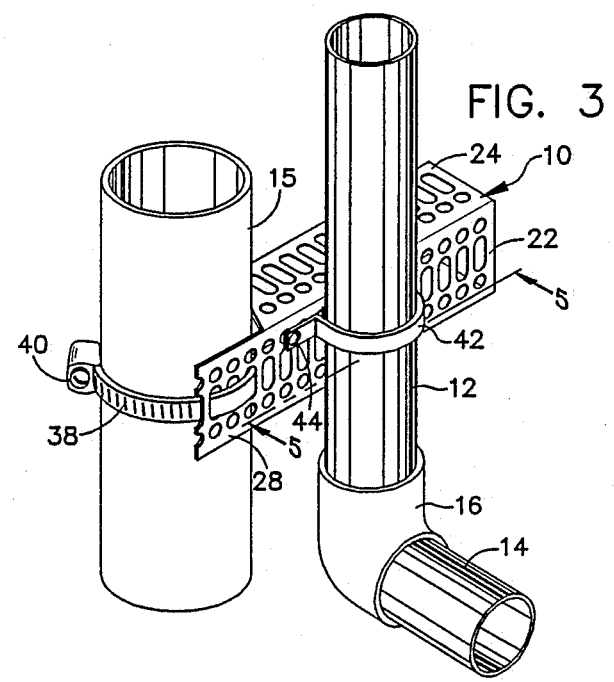
FIG. 3 is a perspective view showing the bracket as it would be used in locating a vertical header.

FIGS. 1 to 6 of the drawings illustrate a first embodiment of a pipe support or bracket 10 for locating and supporting pipes in building construction, as indicated in FIGS. 2 and 3. A typical building structure will include vertical and horizontal runs of hot and cold water pipes or headers 12 and 14, respectively, as well as larger diameter waste pipes and vents 15, with elbow and T-section joints 16 and 18 at appropriate points for joining vertical and horizontal runs. The bracket 10 is designed to be secured to an appropriate supporting member such as a building stud or, as shown in the drawings, to a large diameter vent or waste pipe 15, and to locate either vertically or horizontally extending pipes of various diameters.

Figure 6:
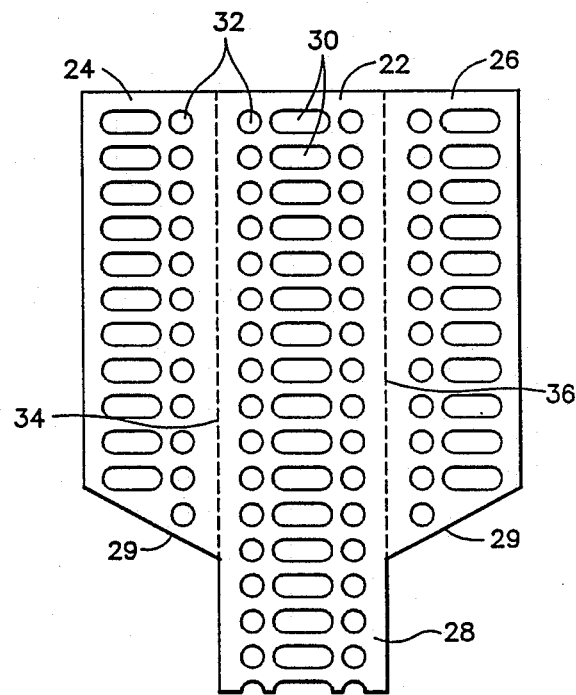
FIG. 6 is a top plan view showing a stage in manufacture of the bracket of FIG. 1.

As shown in FIGS. 1 and 2, the bracket 10 is of generally square, channel-shaped cross-section, and comprises a central web 22 with side flanges 24 and 26 depending from the opposite side edges of the web 22. The central web 22 extends beyond the ends of the side flanges at least at one end of the bracket to provide a locating portion or extension 28. The end edges 29 of the side flanges adjacent extension 28 are cut at an obtuse angle to the extension, as best seen in FIGS. 1 and 6.

Figure 4:
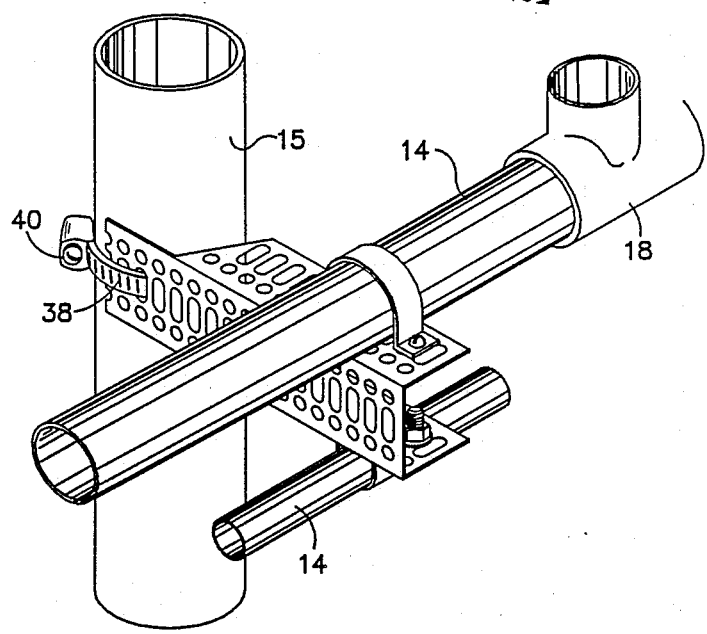
FIG. 4 is a similar perspective view showing the bracket as used to support horizontal pipes.

A row of elongate slots 30 extends along each of the side flanges 24 and 26 and the central web 22. Rows of circular openings 32 extend on opposite sides of the row of slots in the central web 22, and on one side of the row of slots in each side flange, as seen in FIGS. 1, 3 and 4. The spacing between adjacent slots, and between adjacent openings, is preferably of the order of 0.45 inches. The bracket is formed from a suitable rigid material such as metal or plastic, and in the preferred embodiment is cut or stamped from a flat metal sheet of stainless steel or the like, as indicated in FIG. 6, before stamping out the slots 30 and openings 32 and bending the side flanges down along lines 34 and 36.

Figure 5:
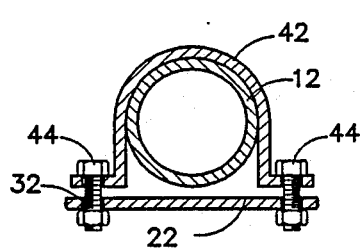
FIG. 5 is a partial section on the lines 5—5 of FIG. 3 showing a C-clamp bolting one of the pipes to a side flange of the bracket.

FIGS. 3 to 5 illustrate the manner in which brackets 10 can be used in assembling a plumbing installation. The outer faces of the central web and side flanges, as well as the inner face of the extending portion 28 of the central web, provide attachment surfaces against which pipes of various diameters can be located and secured. The brackets themselves are supported on selected support members such as building studs, or large diameter waste pipes or vents 15 as shown in the drawings. A bracket is located against a selected supporting pipe or member by placing the inner face of the extension or locating surface 28 against the surface of the member 15 in the selected position and orientation with the end edges 29 of the side flanges bearing against member 15. The angled end edges 29 of the side flanges enable the surface 28 to extend farther over the selected support member, and grip against the member 15 to provide a firmer connection. The bracket is secured to member 15 by means of a connecting band 38 of a standard type which is threaded through appropriate slots 30 in extension 28 and snapped around the member 15. The band 38 is secured in place via screw fastener 40 in a known manner. Slots 30 are appropriately sized to receive a standard pipe clamp or band 38 in the manner illustrated.

The bracket 10 can then be used to secure either vertically or horizontally extending pipes 12 and 14 to the supporting member by securing the pipes against its faces 22 and 24 or 26. FIG. 3 illustrates a vertically extending pipe portion secured against the central web of bracket 10 via a suitable C-clamp member 42 which engages over the pipe and is bolted to web 22 via securing bolts 44 which extend through openings in clamp member 42 and aligned openings 32 in the web 22, as indicated in FIG. 5. FIG. 4 illustrates two horizontal pipes 14 secured against the respective faces of the side flanges 24 and 26 of the bracket 10. Again, the pipes 14 are secured against the bracket via C-clamps 42 which extend over the pipes and are bolted to the respective side flanges at the appropriate positions. Larger diameter pipes may be secured in place using connecting bands which extend through appropriate slots 30 and around the pipe before being snapped in place and screwed down firmly.

A series of brackets 10 will be mounted on suitable support members at appropriately spaced intervals along lengths of pipe in a plumbing system for holding the pipe or pipes firmly in place to resist vibration or movement. The brackets are suitably mounted on appropriate support members such as waste pipes along a length of water pipeline, and the pipeline is secured to the appropriately orientated faces of the brackets where it passes them.

Figure 7:
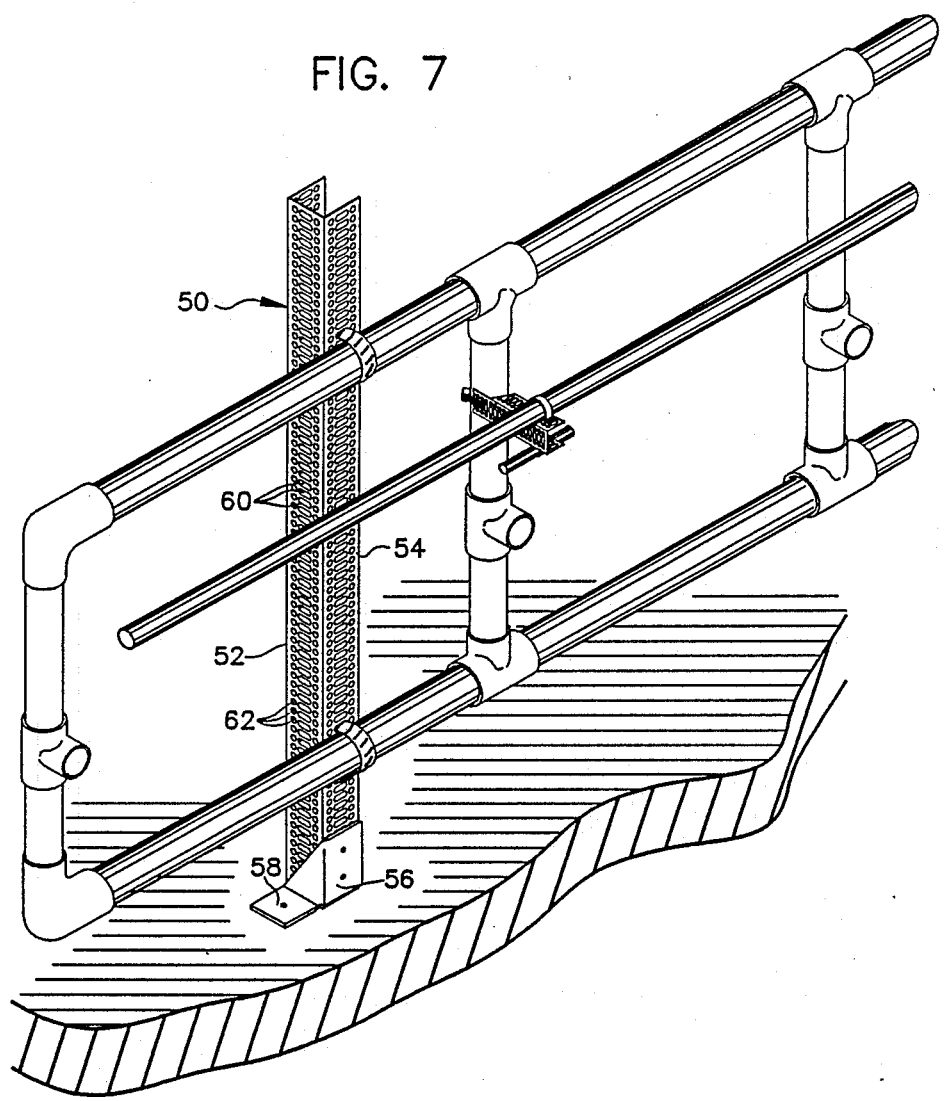
FIG. 7 is a perspective view showing a pipe supporting bracket according to a second embodiment of the invention.

FIG. 7 illustrates a pipe supporting bracket 50 according to a second embodiment of the invention. The bracket is of generally square, channel-shaped cross-section as in the first embodiment, consisting of a central web 52 and downwardly depending side flanges 54. However, this version is designed to be anchored to the floor and extend vertically to provide support for horizontally extending pipes, as indicated in FIG. 7. A suitable fastener or boot 56 is bolted to one end of the bracket, and has a foot or clamp surface 58 for bolting to the floor.

The bracket 50 preferably has the same pattern of elongate slots 60 and circular bolt openings 62 as in the shorter version of the first embodiment. Thus, pipes can be secured to any outer face of the bracket at any appropriate height via securing bands which extend through the slots or via C-clamps, which are secured via bolts which extend through openings 62. The bracket 50 is preferably at least 48 inches long, to accommodate the height of horizontal runs in most plumbing systems. It is a standard requirement in plumbing installations that a vent pipe must extend at least 6 inches vertically above the overflow level of the fixture before turning horizontally to run to another part of the building. Since the overflow level in the highest standard plumbing fixture would normally be no greater than 42 inches above the floor, a vertical supporting bracket length of at least 48 inches would ensure that the highest horizontal runs of plumbing pipes can be supported.

An entire plumbing system can be supported quickly and easily using a combination of floor supported brackets 50 at spaced intervals along the length of the assembly, and the shorter pipe-to-pipe connecting brackets 10 at appropriate positions.

A series of brackets can thus be used to support plumbing pipes at a wide variety of spaced positions and in both vertical and horizontal orientations. The bracket is not limited to specific pipe diameters, but can be used to secure any diameter pipe to a supporting member. Thus a piping installation can be supported quickly and easily using a minimum of different components. All that is needed is a supply of brackets 10 along with connecting bands and C-clamps for securing pipes and support members to the bracket. The water lines in a plumbing installation can be pre-mounted in this fashion prior to assembly at the plumbing site.

This arrangement helps to reduce noise problems resulting from pipe movement, by securing pipes against movement away from the frame.

Although a preferred embodiment of the invention has been described above by way of example only, it will be understood by those skilled in the field that modifications may be made to the disclosed embodiment without departing from the scope of the invention, which is defined by the appended claims.

What is claimed:

1. A pipe support, comprising:
a bracket of square, channel-shaped cross-section comprising three perpendicular faces, the faces comprising a central web portion and side flanges depending from opposite side edges of the web portion;
the central web portion projecting beyond the ends of the side flanges at least at one end of the bracket to provide locating means for locating the bracket against a supporting member, each of the end edges of the side flanges adjacent the central web portion being inclined at an obtuse angle to the projecting central web portion, said locating means further including said adjacent end edges of the side flanges, said adjacent end edges being free and uncovered and comprising means for direct engagement with a supporting pipe;
the central web portion and side flanges having spaced fastener openings extending along their length for receiving fastener means for selectively securing pipes against the outer faces of the web portion and side flanges; and
the fastener openings along at least one of the bracket faces comprising at least two rows of openings extending side by side along the entire length of the respective bracket face, one of the rows comprising circular openings for receiving bolts and the other row comprising elongate slots for receiving connecting bands threaded through the slots.

2. The support as claimed in claim 1, wherein each of the side flanges and the central web has a row of elongate slots and at least one row of circular openings extending along its length.

3. A pipe support, comprising:
an elongate bracket at least 48 inches in length, the bracket being of square, channel shaped cross-section comprising three perpendicular faces, the faces comprising a central web portion and side flanges depending from opposite side edges of the central web portion;
the central web portion and side flanges having spaced fastener openings extending along their length for receiving fastener means for selectively securing pipes against the outer surfaces of the web portion and side flanges;
the fastener openings along at least one of the bracket faces comprising at least two rows of openings extending side by side along the entire length the respective bracket face, one of the rows comprising circular openings for receiving bolts and the other row comprising elongate slots for receiving connecting bands threaded through the slots; and
fastener means at one end of the bracket for securing the bracket to a flat surface extending perpendicular to the length of the bracket, the fastener means including a portion extending transverse to the longitudinal axis of the bracket having openings for receiving fastener means for securing said end of the bracket to the flat surface so that said bracket projects transversely away from said surface.

4. A pipe supporting assembly, comprising:
a bracket of square, channels-shaped cross-section having a central web with a pair of side flanges depending from the respective opposite side edges of the central web, the central web being longer than the side edges so that it projects beyond the ends of the side flanges at least at one end of the bracket, each of the end edges of the side flanges adjacent the projecting central web portion being free and uncovered and being inclined at an obtuse angle to the projecting central web portion, and the central web being of uniform width between its opposite side edges along the entire length of the web, the central web and side flanges each having a series of openings extending along their length;
the end of the central web which projects beyond the ends of the side flanges, and the adjacent inclined free ends of the side flanges, together comprising locating means for direct engagement with a supporting member to locate the bracket against the supporting member; and
fastener means for extending through said openings to selectively secure members against the side flanges and central web of the bracket.

5. The assembly as claimed in claim 4, wherein the central web and side flanges each have at least two rows of openings extending side by side along their entire length, one of the rows comprising circular openings for receiving bolts and the other row comprising elongate slots for receiving connecting bands threaded through the slots.

6. The assembly as claimed in claim 4, wherein said fastener means comprise connecting bands for threading through selected ones of said openings and securing around a member to be secured to said bracket.

7. The assembly as claimed in claim 6, wherein said fastener means further include clamp members for engaging over a member placed against a face of said bracket, and bolt means for extending through said clamp members and openings in the respective face of said bracket to bolt the clamp member to the bracket.

8. A method of supporting a series of pipes, comprising the steps of:
locating a supporting bracket of channel-shaped cross-section comprising a central web with side flanges depending from opposite side edges of the central web relative to a supporting pipe by placing an inner face of the projecting end of the central web of the bracket directly against the supporting pipe and pushing the adjacent free and uncovered end edges of the depending side flanges of the bracket into direct engagement with the supporting pipe, said adjacent end edges being inclined at an obtuse angle to the projecting end of the central web;
securing the supporting bracket to the pipe by passing a fastener band through slots in the projecting end of the central web and around the pipe; and
securing selected pipes to the bracket by placing the pipes directly against any of the outer faces of the central web and side flanges at any selected locations by extending fasteners around the respective pipes and through fastener openings provided in the central web and side flanges.

* * * * *